United States Patent Office

2,990,273
URANIUM RECOVERY FROM METALLIC MASSES

Premo Chiotti, Ames, Iowa, assignor to the United States of America as represented by the United States Atomic Energy Commission
No Drawing. Filed Aug. 28, 1959, Ser. No. 836,833
12 Claims. (Cl. 75—84.1)

This invention deals with a process of separating and recovering uranium from metallic mixtures or alloys. The process is primarily concerned with the isolation of uranium from mixtures containing also other actinides and fission product values. Such metallic mixtures are found in so-called blanket materials which are used in breeder reactors and which contain thorium metal as the predominant material. However, neutron-irradiated fuel elements which consist predominantly of uranium metal and also contain plutonium and fission products can also be processed by the method of this invention.

Thorium blankets are arranged at the periphery of so-called breeder reactors to capture, and react with, the neutrons escaping the fissionable fuel material; the thorium reacts with these neutrons by an n, γ reaction and subsequent beta decay whereby $U^{233}$ is formed. Such breeder reactors are described, for instance, in copending application Serial No. 721,108 on "Fast Neutron Reaction System," filed by Walter H. Zinn on January 9, 1947, now Patent No. 2,975,117, issued March 14, 1961.

The thorium blankets, after use in a neutronic reactor, contain very small proportions, relatively and absolutely speaking, of $U^{233}$; these small quantities are difficult to separate. Uranium-233 is a fissionable material and therefore valuable as fuel for neutronic reactors. For this reason it is highly desirable to separate the $U^{233}$ formed from the thorium, protractinium and fission products formed.

In most processes used heretofore the fuel or blanket material is dissolved in an aqueous acid medium and the various salts obtained thereby are then separated by solvent extraction or precipitation. These processes have the disadvantage that they require, apart from the separation steps proper, a dissolution step, concentration steps and a step by which the isolated salts have to be reconverted to the metal.

A more satisfactory process has also been developed by which the thorium is extracted into molten magnesium and the uranium precipitated as such. This process is covered by copending application Serial No. 696,889, now Patent No. 2,942,968, issued June 28, 1960, filed by this inventor and another on November 15, 1957. The process of said application treats the uranium-thorium material with magnesium metal at from 800 to 900° C. so that the uranium, with a very small quantity of thorium and with all of the protactinium, remains undissolved. This metal residue, according to said copending application, can be alloyed with 5.2% by weight of chromium to form the eutectic and thus to lower its melting point.

The magnesium extraction process just described does not accomplish a separation of the uranium from the protactinium, as has just been pointed out, and it also does not bring about a quantitative separation from the thorium. The presence of protactinium is especially disadvantageous, because it has a high neutron-capture cross section; thus, protactinium "poisons" the $U^{233}$ for use as reactor fuel. Protactinium can be removed by aging whereby it beta-decays and forms $U^{233}$. However, frequently it is desirable to use the $U^{233}$ promptly, that is before the $Pa^{233}$ has a chance to transform.

It is an object of this invention to provide a process for the recovery of uranium metal from a mixture containing it together with other metals which does not require dissolution in an aqueous medium.

It is another object of this invention to provide a process for the recovery of uranium metal from a mixture containing it together with other metals by which uranium is recovered and a high degree of separation of the uranium from the protactinium as well as from the thorium is accomplished.

It has been tried to chlorinate the metal residue obtained in the process of application Serial No. 696,889, now Patent No. 2,942,968, issued June 28, 1960, and then to reduce the chlorides with magnesium metal. However, it was found that magnesium does not reduce uranium trichloride, which was the chloride formed, to completion, because there was not sufficient free energy available for the reduction reaction. It was found, however, that if zinc was present together with the magnesium, a reaction did take place with the uranium chloride and an intermetallic uranium-zinc compound was formed. This new reaction with the zinc metal furnished enough free energy to drive the reaction to completion. Analogous reductions took place with the zirconium, thorium and protactinium chlorides.

It was furthermore discovered that a mixture of lithium chloride-potassium chloride eutectic with magnesium chloride is not operative for the chlorination of the precipitated uranium phase and does not accomplish a separation of the protactinium from the uranium. Zinc chloride, however, was found not only to chlorinate these metals but at the same time to separate the chlorides formed from a metal phase that contains a great many of the non-rare-earth fission products, such as iron, molybdenum, niobium, tantalum and ruthenium. Also, if the precipitated metal phase was alloyed with chromium as above described, the chromium, too, will be in said metal phase in the form of an intermetallic chromium-zinc compound. Some of the zinc chloride added is reduced to the metal during chlorination and any metallic zinc not combined with the chromium also stays in the metal phase. The zinc which reacts with the chromium prevents the latter from being chlorinated and going into the salt phase. Thus the zinc chloride has a triple function: It chlorinates some metals, it separates the uranium from most non-rare-earth fission products, and it prevents chromium from being chlorinated and thereby effects a separation of the uranium from the chromium. The process of this invention is based on all these findings.

The process of this invention thus comprises reacting the thorium blanket material containing $U^{233}$, protactinium, zirconium and rare-earth fission products with magnesium metal, e.g. with from 48 to 85% by weight at from 800 to 900° C., whereby the uranium and the protactinium together with a small quantity of the thorium, zirconium and some of the fission products remain as an undissolved metal residue; separating the metal residue from a molten thorium-magnesium alloy; adding to the metal residue a molten mixture of zinc chloride and the potassium chloride-lithium chloride (or sodium chloride) eutectic; reacting the metal residue with the molten chlorides at a temperature of between 450 and 650° C. until equilibration as to chlorination and zinc formation has been reached; separating a metal phase containing non-chlorinated metals and zinc formed from a salt phase containing thorium chloride, uranium chloride, protactinium chloride, zirconium chloride and rare-earth fission-product chlorides; adding a magnesium-containing zinc-base alloy stepwise to said salt phase whereby the zirconium and thorium, the uranium and the protactinium precipitate successively in the order given in the form of intermetallic zinc compounds; and heating the uranium-containing intermetallic compound to a temperature above about 1100° C. whereby the zinc and any magnesium present volatilize and pure uranium metal is obtained. (The term rare-earth fission products in this application is to cover the rare earths of the lanthanide group.)

The uranium-thorium blanket material as it comes from the reactor is melted with from 48 to 85% of magnesium in accordance with the process of copending application Serial No. 696,889, now Patent No. 2,942,968, issued June 28, 1960. The metal residue obtained thereby can then be alloyed with chromium to form the uranium-chromium eutectic and to lower the melting point of the metal phase; a temperature of from 860 to 900° C. is suitable for the alloying with chromium. This step, however, is optional. The metal residue, with or without the chromium, is then treated by the process of this invention.

The chloride mixture is then added to the metal residue. The salt mixture is preferably a potassium chloride-lithium chloride-zinc chloride mixture, as has been set forth above; however, instead of the lithium chloride, sodium chloride can also be used. The zinc chloride is desirably present in a concentration range from 10 to 20% by weight and the salt mixture is added in more than stoichiometric quantity, as to zinc chloride necessary for the chlorination of the uranium. The reaction and equilibration temperature may range from 450 to 700° C., but the range of from 600 to 650° C. is preferred. Equilibration usually takes from one to two hours.

The metal phase, namely, the phase containing the metals that did not react with the zinc chloride, contains practically all chromium in the form of an intermetallic compound with the zinc which has formed by the chlorination of the other metals; it also contains practically all iron, molybdenum, niobium, tantalum, ruthenium and about 20% of the zirconium. All these metals are non-rare-earth fission products. The metal phase, of course, also contains any zinc formed that is in excess of that entered into the chromium-zinc compound.

The salt phase contains all the chlorides that have formed by reaction with the zinc chloride; thorium chloride, uranium chloride, protactinium chloride, rare-earth-fission-product chlorides, about 80% of the zirconium as zirconium chloride and the excessive (nonreacted) zinc chloride are present in the salt mixture together with the alkali metal chlorides. The salt phase is the lighter phase and floats on top of the metals. It is separated from the metal layer, for instance, by decantation. The metal phase is usually discarded.

The salt phase is processed, primarily for the isolation of the uranium, but also for the separation of the other chlorides. For this purpose a binary zinc-base alloy containing preferably from 1 to 7% of magnesium is added to the salt phase. The temperature of the reaction container is held at from 425 to 525° C., a temperature of about 450° C. being preferred. The magnesium metal prevents the rechlorination of the reduced uranium by taking up the chlorine and forming magnesium chloride.

The free energy of the reaction of the chlorides with the magnesium-zinc alloy has been determined. There is evidence that under the operating conditions specified above zirconium is present as the trichloride. This is shown, for instance, in report ANL-5750, Table IV. The following equations give the reactions together with the energies released:

(1) $2UCl_3 + 17Zn + 3Mg \rightarrow 3MgCl_2 + U_2Zn_{17}$
$\Delta$ ° F. (500 C.) = 82 KCal.

(2) $2ZrCl_3 + 28Zn + 3Mg \rightarrow 3MgCl_2 + 2ZrZn_{14}$
$\Delta$ ° F. (500° C.) = −108 KCal.

(3) $2ThCl_4 + 17Zn + 4Mg \rightarrow MgCl_2 + Th_2Zn_{17}$
$\Delta$ ° F. (500° C.) = −126 KCal.

It has been found that, if the magnesium-zinc alloy is added in installments, a fractional formation and precipitation of intermetallic compounds takes place in the order of decreasing free energies developed. Therefore, in order to obtain the uranium free from the other metals, the alloy is best added in installments. For the precipitation of the zirconium and the thorium about stoichiometric amounts of zinc in the form of the alloy are added. The compounds precipitated are $ZrZn_{14}$ and $Th_2Zn_{17}$. Uranium is the next metal that precipitates; it comes down as $U_2Zn_{17}$. To precipitate the uranium quantitatively, a small excess of magnesium-zinc alloy in the order of at least 0.06% of magnesium should be added. The excess should not be too large so that the protactinium does not precipitate with the uranium. An excess of about 0.5% is the preferred quantity. Also, in order to obtain quantitative uranium precipitation and a minimum of proctactinium precipitation in this step, equilibration for approximately one hour is advisable. The last precipitation step is for the precipitation of protactinium; it requires a large excess of zinc-magnesium alloy; for instance, an excess at least about 30% by weight over the amount stoichiometrically required is satisfactory.

In order to recover the uranium in pure form from the intermetallic compound, the latter is heated to a temperature above about 1110° C., or to a lower temperature while simultaneously applying a vacuum; the zinc and magnesium distill off during this step, and uranium metal is obtained in pure form.

In the following, an example is given to illustrate the process of this invention.

*Example*

A graphite container lined with tantalum and having an external steel casing is used; it is charged and then weld-sealed under an argon atmosphere. The charge is mixed by placing the container in a rocking furnace which oscillates through an arc of about 180 degrees sixty times per minute. The reaction time is ½ hour, whereupon rocking is discontinued and the mass is allowed to settle for about one hour. Finally, the container is cooled to room temperature.

The charge consists of 1 kg. of a metal residue containing 94% of natural uranium, 5.1% of chromium, 0.49% of thorium, 0.45% of zirconium and $10^4$ c./m./g. of protactinium. To this metal residue are then added 3.5 kg. of the lithium chloride-potassium chloride eutectic and 0.875 kg. of anhydrous zinc chloride. The mass is heated to a temperature of between 600 and 700° C. in the rocking furnace.

After settling and cooling to room temperature, the salt phase is decanted off and both phases are weighed and analyzed for their metal contents. The metal phase weighs 430 g. and contains 8.5% of chromium, 0.01% of zirconium, 0.05% of thorium, 0.15% of uranium and $0.2 \times 10^2$ c./m./g. of protactinium. The salt phase weighs 4.82 kg. and contains 0.30% of chromium, 0.09% of zirconium, 0.10% of thorium, 19.1% of uranium and $1.9 \times 10^3$ c./m./g. of protactinium.

The salt is allowed to solidify and a 1-kg. fraction is used for further treatment. The salt is first melted and held at a temperature of about 450° C. Seventy grams of zinc and 1.87 g. of magnesium are then added and reacted as above for ½ hour in the rocking furnace. The mass is then cooled with an air blast. The precipitate present in the melted mass is removed by centrifuging, and the remaining salt phase is then analyzed for thorium and zirconium contents. It contains 0.003% of thorium and zirconium in such a small quantity that it can be detected only by spectroscopy.

Thereafter 1340 g. of zinc and 29.4 g. of magnesium are added to the salt. The precipitate formed is again removed by centrifugation and in the remaining salt phase is again analyzed; it has a uranium content of 0.0% and a residual protactinium content of $1.72 \times 10^3$ c./m./g. Finally, another portion of magnesium-zinc, this time 2 g. of magnesium and 50 g. of zinc, is added and the metal phase is separated from the salt phase by centrifuging. The protactinium content of the remaining salt phase is 120 c./m./g.

While the process has been illustrated as applied to a neutron-irradiataed thorium blanket, it is equally well applicable to the processing of neutron-irradiated uranium. In this case the plutonium is removed in the first step when the metal is melted with from 48 to 85% of magnesium. In this instance the melted metal containing the bulk of the thorium also has all of the plutonium.

It will be understood that this invention is not to be limited to the details given herein but that it may be modified within the scope of the appended claims.

What is claimed is:

1. A process of recovering uranium from neutron-irradiated thorium-base metal containing $U^{233}$, protactinium, zirconium and rear-earth fission products, comprising reacting the neutron-irradiated metal with magnesium at from 800 to 900° C. whereby the magnesium, the thorium and part of the fission products form a liquid alloy while the uranium and the protactinium together with a small quantity of the thorium and some of the fission products remain as a solid metal residue; separating the solid metal residue from the liquid alloy; adding to the metal residue a molten mixture of zinc chloride and the eutectic between potassium chloride and an alkali chloride selected from the group consisting of lithium chloride and sodium chloride; reacting the metal residue with the molten chloride mixture at a temperature of between 450 and 700° C. until equilibration as to chlorination and zinc formation has been reached; separating a metal phase, containing nonchlorinated metals and zinc formed, from a salt phase containing thorium chloride, uranium chloride, protactinium chloride, zirconium chloride and rare-earth fission-product chlorides; adding a binary magnesium-containing (1–7%) zinc-base alloy stepwise to said salt phase, in the first step adding an amount having the stoichiometric quantity of zinc for the conversion of all thorium and all zirconium to salt-insoluble $Th_2Zn_{17}$ and $ZrZn_{14}$, respectively, in the second step adding an amount of alloy containing from stoichiometric quantity to an 0.5% excess of zinc for the conversion of all uranium to salt-insoluble $U_2Zn_{17}$ and in the third and last step adding a large excess of said alloy for the precipitation of protactinium as a zinc compound, each time removing the insoluble metal-zinc compounds prior to adding a new installment of magnesium-containing zinc-base alloy; and heating the uranium-containing intermetallic compound to a temperature above about 1100° C. whereby the zinc and any magnesium present volatilize and pure uranium metal is obtained.

2. The process of claim 1 wherein the eutectic is a potassium chloride-lithium chloride mixture.

3. The process of claim 1 wherein the eutectic is a potassium chloride-sodium chloride mixture.

4. The process of claim 1 wherein the molten mixture contains from 10 to 20% by weight of zinc chloride.

5. The process of claim 4 wherein the molten mixture is added in a quantity of above stoichiometric amounts with regard to the quantity necessary to chlorinate the uranium.

6. The process of claim 1 wherein the equilibration temperature ranges between 600 and 700° C.

7. The process of claim 1 wherein the zinc-base alloy is added to the salt phase while it has a temperature of about 450° C.

8. The process of claim 1 wherein said zinc-base alloy is first added in a stoichiometric quantity for the conversion of the zirconium and the thorium from the chlorides, the precipitated zirconium and thorium compounds are removed from the salt phase, another quantity of zinc-base alloy is added in an amount excessive by from 0.06 to 0.5% over the stoichiometric quantity—as to uranium present—the precipitated uranium-zinc compound is removed and then a large excess of zinc-base alloy is added for the precipitation of protactinium.

9. A process of recovering uranium from neutron-irradiated thorium-base metal containing $U^{233}$, protactinium, zirconium and rare-earth fission products, comprising reacting the neutron-irradiated metal with magnesium at from 800 to 900° C. whereby the magnesium, the thorium and part of the fission products form a liquid alloy while the uranium and the protactinium together with a small quantity of the thorium and some of the fission products remain as a solid metal residue; separating the solid metal residue from the liquid alloy; adding about 5% by weight of chromium, as to uranium content, to said metal residue while maintaining the latter at from 860 to 900° C.; adding to the metal residue a molten mixture of zinc chloride and the eutectic between potassium chloride and an alkali chloride selected from the group consisting of lithium chloride and sodium chloride; reacting the metal residue with the molten chloride mixture at a temperature of between 450 and 700° C. until equilibration as to chlorination and zinc formation has been reached; separating a metal phase, containing nonchlorinated metals, including chromium, and zinc formed, from a salt phase containing thorium chloride, uranium chloride, protactinium chloride, zirconium chloride and rare-earth fission-product chlorides; adding a binary magnesium-containing (1–7%) zinc-base alloy stepwise to said salt phase, in the first step adding an amount having the stoichiometric quantity of zinc for the conversion of all thorium and all zirconium to salt-insoluble $Th_2Zn_{17}$ and $ZrZn_{14}$, respectively, in the second step adding an amount of alloy containing from stoichiometric quantity to an 0.5% excess of zinc for the conversion of all uranium to salt-insoluble $U_2Zn_{17}$ and in the third and last step adding a large excess of said alloy for the precipitation of protactinium as a zinc compound, each time removing the insoluble metal-zinc compounds prior to adding a new installment of magnesium-containing zinc-base alloy; and heating the uranium-containing intermetallic compound to a temperature above about 1100° C. whereby the zinc and any magnesium present volatilize and pure uranium metal is obtained.

10. A process of recovering uranium from neutron-irradiated thorium-base metal containing $U^{233}$, protactinium, zirconium and rare-earth fission products, comprising reacting the neutron-irradiated metal with from 48 to 85% by weight of magnesium at from 800 to 900° C. whereby the magnesium, the thorium and part of the fission products form a liquid alloy while the uranium and the protactinium together with a small quantity of the thorium and some of the fission products remain as a solid metal residue; separating the solid metal residue from the liquid alloy; adding about 5% by weight of chromium, as to uranium content, to said metal residue while maintaining the latter at from 860 to 900° C.; adding to the metal residue a molten mixture of zinc chloride and the eutectic between potassium chloride and lithium chloride, said mixture containing from 10 to 20% by weight of zinc chloride and said mixture being used in a quantity in excess of that necessary for chlorination of all of the uranium present by the zinc chloride; reacting the metal residue with the molten chloride mixture at a temperature of between 600 and 650° C. until equilibration as to chlorination and zinc formation has been reached; separating a metal phase, containing nonchlorinated metals, including chromium, and zinc formed, from a salt phase containing thorium chloride, uranium chloride, protactinium chloride, zirconium chloride and rare earth fission product chlorides; adding a zinc-base alloy containing from 4 to 7% by weight of magnesium stepwise to said salt phase at a temperature of about 450° C., in the first step adding an amount having the stoichiometric quantity of zinc for the conversion of all thorium and all zirconium to salt-insoluble $Th_2Zn_{17}$ and $ZrZn_{14}$, respectively, in the second step adding an amount of alloy containing from stoichiometric quantity to an 0.5% excess of zinc for the conversion of all uranium to salt-insoluble $U_2Zn_{17}$ and in the third and last step adding a large excess of said alloy for the precipitation of protactinium as a zinc compound, each time removing the insoluble metal-zinc compounds prior to adding a new installment of magnesium-containing zinc-base alloy; and heating the uranium-containing intermetallic compound to a temperature above about 1100° C. whereby the zinc and any magnesium present volatilize and pure uranium metal is obtained.

11. A process of separating uranium from a metal mixture containing said uranium, protactinium and thorium, comprising heating said metal mixture to from 450 to 650° C.; adding a potassium chloride-lithium chloride eutectic also containing from 10 to 20% of zinc chloride to said metal mixture whereby said metals are chlorinated and separated from a metal phase containing the zinc formed; adding a zinc-base alloy containing from 4 to 7% by weight of magnesium stepwise to the metal chlorides formed whereby the thorium, the uranium and the protactinium precipitate successively in the order given as intermetallic zinc compounds, said precipitates being removed from the chloride mixture each time prior to the next zinc-magnesium addition; and heating the uranium-zinc compound for volatilization of the zinc and any magnesium whereby pure uranium metal is obtained.

12. A process of separating uranium from a chromium-containing alloy, comprising heating said alloy to from 450 to 700° C.; adding a potassium chloride-lithium chloride eutectic containing from 10 to 20% by weight of zinc chloride to said alloy, whereby a zinc- and chromium-containing metal phase and a uranium-chloride-containing salt phase are obtained; and separating said metal phase from said salt phase.

References Cited in the file of this patent

UNITED STATES PATENTS

| | | |
|---|---|---|
| 2,758,023 | Bareis | Aug. 7, 1956 |
| 2,766,110 | Meister | Oct. 9, 1956 |